(12) United States Patent
Takemoto et al.

(10) Patent No.: US 10,759,064 B2
(45) Date of Patent: Sep. 1, 2020

(54) ROBOT AND METHOD FOR DESIGNING ROBOT SHAPE

(71) Applicants: DENSO WAVE INCORPORATED, Chita-gun, Aichi-pref. (JP); DENSO CORPORATION, Kariya, Aichi-pref. (JP)

(72) Inventors: Hiroyuki Takemoto, Chita-gun (JP); Hiroshi Kondoh, Nagoya (JP)

(73) Assignees: DENSO WAVE INCORPORATED, Aichi-pref. (JP); DENSO CORPORATION, Kariya (JP)

( * ) Notice: Subject to any disclaimer, the term of this patent is extended or adjusted under 35 U.S.C. 154(b) by 508 days.

(21) Appl. No.: 14/854,792

(22) Filed: Sep. 15, 2015

(65) Prior Publication Data

US 2016/0107314 A1   Apr. 21, 2016

(30) Foreign Application Priority Data

Oct. 20, 2014   (JP) ................... 2014-213634

(51) Int. Cl.
*B25J 19/00* (2006.01)
*B25J 19/06* (2006.01)

(52) U.S. Cl.
CPC ........... *B25J 19/007* (2013.01); *B25J 19/063* (2013.01); *Y10S 901/49* (2013.01)

(58) Field of Classification Search
CPC ....... B25J 9/1674; B25J 19/007; B25J 19/063
USPC ......................................... 901/49
See application file for complete search history.

(56) References Cited

U.S. PATENT DOCUMENTS

| 5,744,728 A | * | 4/1998 | Suita ...................... B25J 19/063 73/862.542 |
| 8,286,528 B2 | * | 10/2012 | Fujioka ................... B25J 9/102 74/490.01 |
| 8,584,547 B2 | * | 11/2013 | Sirkett ................. B25J 19/0091 901/49 |
| 2003/0137219 A1 | | 7/2003 | Heiligensetzer et al. |
| 2003/0233171 A1 | | 12/2003 | Heiligensetzer |
| 2004/0186626 A1 | | 9/2004 | Tsukamoto et al. |
| 2005/0103147 A1 | * | 5/2005 | Lee ....................... B25J 19/0091 74/490.01 |
| 2006/0177295 A1 | | 8/2006 | Frueh et al. |
| 2012/0245733 A1 | | 9/2012 | Bjorn |
| 2013/0338829 A1 | | 12/2013 | Schlaich et al. |

(Continued)

FOREIGN PATENT DOCUMENTS

| JP | 53-136260 | * | 11/1978 |
| JP | 2012-110971 A | | 6/2012 |

(Continued)

*Primary Examiner* — William C Joyce
(74) *Attorney, Agent, or Firm* — Oliff PLC (57) ABSTRACT

A robot includes a movable unit and a driving unit that drives the movable unit. The movable unit includes a predicted colliding section that is a structure forming an outer shape of the movable unit and may collide with a human body during movement of the movable unit. The predicted colliding section is formed to have a predetermined shape such that a pressure applied to a human body is lower than a predetermined safety standard value for pressure for the human body when the movable unit is driven at maximum thrust by the driving unit and collides with the human body.

4 Claims, 6 Drawing Sheets

(56) References Cited

U.S. PATENT DOCUMENTS

| | | | | |
|---|---|---|---|---|
| 2014/0142752 | A1* | 5/2014 | Nogami | B25J 9/12 |
| | | | | 700/245 |
| 2015/0239124 | A1 | 8/2015 | Haddadin et al. | |
| 2016/0129595 | A1* | 5/2016 | Gerio | B25J 9/1676 |
| | | | | 901/14 |
| 2017/0334076 | A1* | 11/2017 | Bordegnoni | B25J 19/02 |

FOREIGN PATENT DOCUMENTS

| | | |
|---|---|---|
| JP | 2013-193137 A | 9/2013 |
| JP | 2014-042984 A | 3/2014 |

\* cited by examiner

ROBOT AND METHOD FOR DESIGNING ROBOT SHAPE

CROSS-REFERENCE TO RELATED APPLICATION

This application is based on and claims the benefit of priority from Japanese Patent Application No. 2014-213634, filed Oct. 20, 2014, the disclosure of which is incorporated herein in its entirety by reference.

BACKGROUND

Technical Field

The present invention relates to a robot provided with a movable unit and a method for designing a shape of a robot.

Related Art

There is a possibility that a robot may collide with a person or a structure in the vicinity when, for example, a movable unit, such as an arm, moves or rotates. Therefore, safety measures are taken. For example, the robot may be surrounded by a safety gate to prevent people from entering the range of movement of the movable unit during operation. However, a situation in which a person enters the range of movement during a setup operation, production, or the like can also be conceived as a possibility. Therefore, safety measures that prevent effects on the human body are also implemented on the robot side. For example, JP-A-2013-193137 discloses providing a detection function for detecting the approach of a human body. The operation of the robot is stopped before the movable unit comes into contact with the human body. In addition, for example, JP-A-2012-110971 discloses providing a mechanism for reducing impact when a collision with the arm is detected.

However, in a configuration in which control is performed to prevent a collision, such as that in JP-A-2013-193137, for example, correct control of the robot, that is, the robot being operated in a normal state is a premise and a requisite. Should an abnormality occur in the robot, the collision prevention control itself cannot be performed. In this way, actualizing intrinsic safety in a robot is difficult in robots configured on the basis of the concept of so-called functional safety.

Furthermore, in a configuration in which a collision prevention mechanism is provided, such as that in JP-A-2012-110971, for example, the collision prevention mechanism starts operation after a collision has occurred. Therefore, the human body is impacted at the instant of collision, and effects on the human body are not necessarily eliminated. In addition, because the weight of the arm increases when the collision prevention mechanism is provided, the output of a driving unit for driving the arm is required to be increased. As a result, the force applied at the time of collision increases, thereby causing concern that the effects on the human body upon collision are actually increased. Moreover, when the output of the driving unit is increased, the driving unit itself becomes larger in size, resulting in a larger robot.

Impact at the time of collision can be reduced by the movable unit being covered with a shock-absorbing cushion material or the like. However, such a configuration leads to situations that are undesirable in terms of the robot. For example, the outer shape of the movable unit (such as an arm) increases in size, resulting in a smaller workspace. The robot may also become larger, as described above.

SUMMARY

It is thus desired to provide a robot and a method for designing the shape of a robot that can actualize intrinsic safety without causing size increase in the outer shape.

A first exemplary embodiment of the present disclosure provides a robot that includes a movable unit and a driving unit that drives the movable unit, the movable unit including a predicted colliding section that is a structure forming an outer shape of the movable unit and may collide with a human body during movement, the predicted colliding section being formed to have a predetermined shape such that a pressure applied to the human body is lower than a predetermined safety standard value for pressure for the human body when the movable unit is driven at maximum thrust by the driving unit (e.g., a motor) and collides with the human body.

As a result, even should the predicted colliding section, such as an outer edge portion of an X base, collide with the human body, the pressure applied to the human body does not exceed a safety standard value. Therefore, intrinsic safety can be actualized in the robot. In this case, a value, such as that based on international standards related to robot safety, may be used as the safety standard value.

In addition, a structure that reduces pressure is obtained by the shape of the predicted colliding section. Therefore, unlike when the above-described cushion material or the like is used, increase in size in the outer shape does not occur.

In the robot according to the present exemplary embodiment, a collided section of the human body with which the predicted colliding section may collide is assumed to be a finger; and a shape of the predicted colliding section may be formed into a curved surface having a radius of curvature that is set to a range satisfying the following expression (1), $$\frac{F}{2W_f \times R \times \cos^{-1}\left(\frac{R - \frac{F}{k}}{R}\right)} \leq P_s \tag{1}$$

where: R is the radius of curvature of the curved surface of the predicted colliding section; F is a pressing force when the driving unit drives the movable unit at maximum thrust and the predicted colliding section presses against the human body; Wf is a width of the finger of which a cross-sectional shape is modelized as a square having the width; k is a coefficient of compressibility of the finger; and Ps is a maximum value of the predetermined safety standard value for pressure.

The finger may be damaged even with relatively small force, compared to other parts of the human body. Therefore, by setting the radius of curvature R of the predicted colliding section to a range satisfying the safety standard value, effects on the human body can be reduced.

In addition, the safety standard values for other parts, such as the upper arm, are set relatively higher than those for the finger. Therefore, when the safety standard values for the finger are satisfied, the safety standards for the other parts can naturally be satisfied. The safety standard values, and the high/low relationship among the safety standard values for each part of the human body are values prescribed at the time of filing of the present application. The values may be changed in the future. However, when risk assessment is performed for contact risk and design is performed with reference to the part subjected to the most stringent safety standard values, the safety standard values can be satisfied even when safety standard values are changed.

In the robot according to the present exemplary embodiment, a collided section of the human body with which the predicted colliding section may collide is assumed to be a finger; and a shape of the predicted colliding section may be formed into a curved surface having a radius of curvature that is set to a range satisfying following expression (2), $$\frac{F}{4 \times R \times R_f \times \cos^{-1}\left(\frac{R - \frac{F}{k}}{R}\right) \times \cos^{-1}\left(\frac{R_f - \frac{F}{k}}{R_f}\right)} \leq P_s \quad (2)$$

where: R is the radius of curvature of the curved surface of the predicted colliding section; F is a pressing force when the driving unit drives the movable unit at maximum thrust and the predicted colliding section presses against the human body; Rf is a diameter of the finger of which a cross-sectional shape is modelized as a circle having the diameter; k is a coefficient of compressibility of the finger; and Ps is a maximum value of the predetermined safety standard value for pressure.

The finger may be damaged even with relatively small force, compared to other parts of the human body. Therefore, by setting the radius of curvature R of the predicted colliding section to a range satisfying the safety standard value, effects on the human body can be reduced. In addition, in a manner similar to that in the invention according to claim 2, described above, when the safety standard values for the finger are satisfied, the safety standards for the other parts can naturally be satisfied.

A second exemplary embodiment of the present disclosure provides a method for designing a shape of a robot including a movable unit and a driving unit that drives the movable unit, the method including designing a shape of a predicted colliding section of the movable unit that may collide with a human body during movement of the movable unit, the shape of the predicted colliding section having a predetermined shape such that a pressure applied to the human body is lower than a predetermined safety standard value for pressure applied to the human body, the pressure being a pressure applied to the human body when the movable unit is driven at maximum thrust by the driving unit and collides with the human body.

As a result, in a manner similar to that in the robot according to the first exemplary embodiment, described above, intrinsic safety can be actualized in the robot. In addition, because pressure is reduced by the shape of the predicted colliding section, increase in size in the outer shape does not occur.

In addition, because of the configuration in which pressure is reduced by the shape of the movable unit, even when the safety standard value for pressure changes, the change can be supported by changing the shape of the movable unit. That is, the safety standard value for pressure can be easily reflected in the design values for designing the robot.

DESCRIPTION OF EMBODIMENTS

An embodiment will hereinafter be described with reference to FIG. 1 to FIG. 6.

Figure 1A:
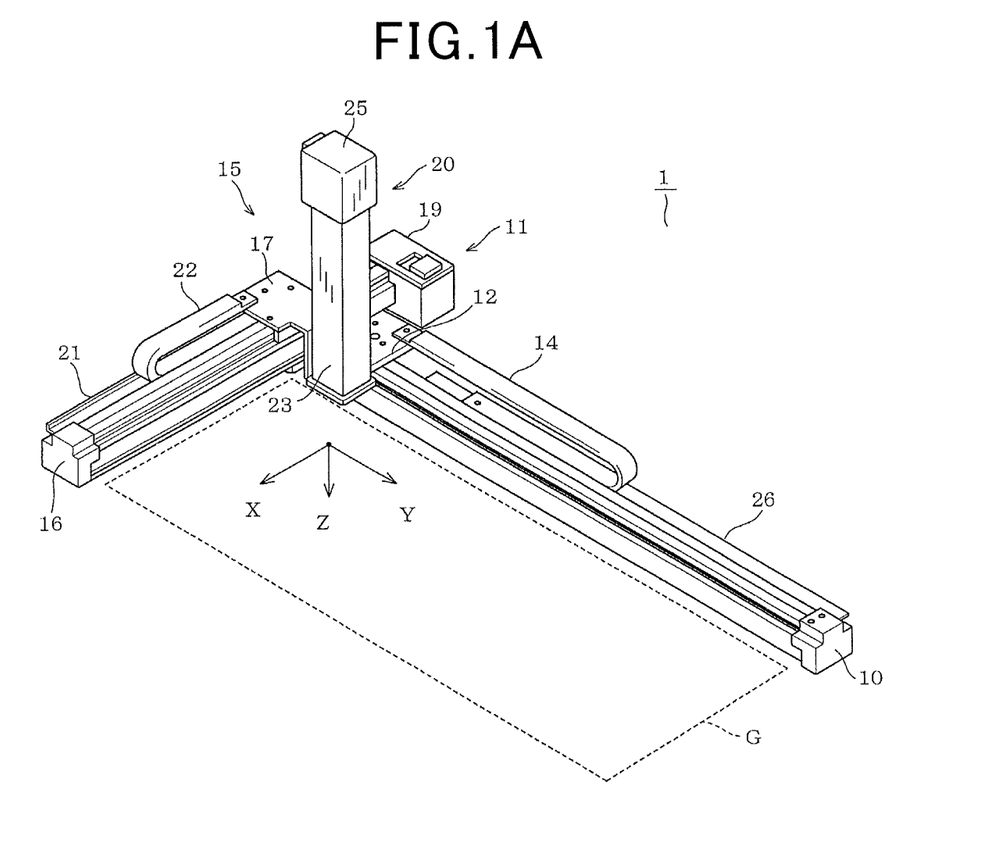
FIGS. 1A and 1B are schematic diagrams of an outer appearance and an electrical configuration of a robot according to a first embodiment.
Figure 1B:
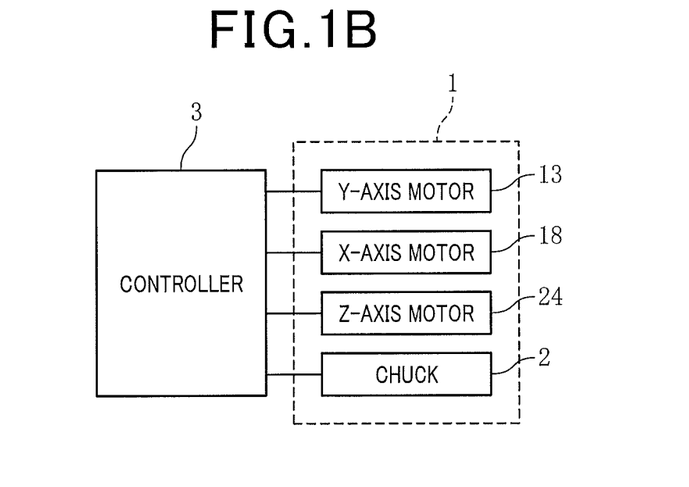

As shown in FIG. 1A, a robot 1 according to the present embodiment is a so-called Cartesian coordinate robot. As is well-known, the robot 1 is configured such that a chuck 2 (see FIG. 1B; also referred to as a hand, a tool, or the like) that is attached to the robot 1 can be positioned in a three-dimensional manner. The movement of the robot 1 and the operation of the chuck 2 are controlled by a controller 3 (see FIG. 1B). FIG. 1A shows an example of a typical configuration of a Cartesian coordinate robot. However, the robot to which the present invention can apply is not limited to that shown in FIG. 1A.

The robot 1 has a linear Y base 10 that is a structure which supports the overall robot 1. A Y-axis movement unit (movable unit) 11 is attached to the Y base 10 such as to be capable of reciprocal movement along the Y base 10. The Y-axis movement unit 11 corresponds to a movable unit of which the position changes during operation of the robot 1. The direction in which the Y base 10 extends will be referred to, hereafter, as the Y-axis direction, for convenience.

The Y base 10 is formed into a hollow, substantially rectangular column. A plurality of pulleys and belts connecting the pulleys are provided within the Y base 10. When the pulleys and belts are driven by a Y-axis motor (driving unit) 13 (see FIG. 1B) and a support plate 12 moves, the Y-axis movement unit 11 fixed to the support plate 12 also moves in accompaniment. The Y-axis movement unit 11 is electrically connected to the Y base 10 side by a cable that is wired inside a Cableveyor (registered trademark) 14.

An X-axis movement unit 15 is attached to the Y-axis movement unit 11. The X-axis movement unit 15 corresponds to a movable unit of which the position changes during operation of the robot 1.

The X-axis movement unit (movable unit) 15 is formed into a hollow, substantially rectangular column. The X-axis movement unit 15 has an X base (predicted colliding section) 16 that extends in a direction perpendicular to the Y base 10. The X base 16 corresponds to a structure (frame) that forms the outer shape of a movable unit. The direction in which the X base 16 extends is referred to, hereafter, as the X-axis direction, for convenience. A plurality of pulleys and belts connecting the pulleys are provided within the X base 16. A support plate (predicted colliding section) 17 is moved as a result of the pulleys being driven by an X-axis motor (driving unit) 18 (see FIG. 1B). The X-axis movement unit 15 that is fixed to the support plate 17 also moves in accompaniment with the movement of the support plate 17.

The X-axis motor 18 is housed within an X motor case (predicted colliding section) 19 that is provided at an end portion of the X base 16. The X motor case 19 corresponds to a structure that forms the outer shape of a movable unit.

A Z-axis movement unit (movable unit) 20 is attached to the X-axis movement unit 15. The Z-axis movement unit 20 corresponds to a movable unit of which the position changes during operation of the robot 1. The Z-axis movement unit 20 is electrically connected to the X-axis movement unit 15 side by a cable that is wired inside a cableveyor 22 (registered trademark) disposed on a rail (predicted colliding section) 21.

The Z-axis movement unit 20 is formed into a hollow, substantially rectangular column. The Z-axis movement unit 20 has a Z base (predicted colliding section) 23 that extends in a direction perpendicular to both the X axis and the Y axis. The Z base 23 corresponds to a structure that forms the outer shape of a movable unit. The direction in which the Z base 23 extends is referred to, hereafter, as the Z-axis direction, for convenience.

A trapezoidal slide shaft (not shown) that extends in the Z-axis direction is rotatably provided inside the Z base 23. In addition, a trapezoidal slide nut (not shown) is screwed onto the trapezoidal slide shaft. The trapezoidal slide nut is attached to the support plate 17 of the X-axis movement unit 15 in a fixed manner. In addition, a Z motor case (predicted colliding section) 25 that houses the Z-axis motor (driving unit) 24 (see FIG. 1B) is provided in the end portion of the Z base 23 shown on the upper side in FIG. 1A. The Z motor case 25 corresponds to a structure that forms the outer shape of a movable unit.

According to the present embodiment, the support plate 17 of the X-axis movement unit 15 is formed into a shape that is a substantially flat plate bent at a right angle. The support plate 17 is arranged such that one surface thereof is parallel to the XY plane and attached to the trapezoidal slide nut for X-axis movement. The other surface is parallel to the XZ plane that is perpendicular to the XY plane. The trapezoidal slide nut for Z-axis movement is attached to the side of the surface parallel to the XZ plane.

Therefore, because the trapezoidal slide nut itself is fixed to the X-axis movement unit 15 side, when the trapezoidal slide shaft for the Z axis is rotatably driven by the Z-axis motor 24 (see FIG. 1B), the trapezoidal slide shaft moves in the Z-axis direction. As a result, the overall Z-axis movement unit 20, including the Z-axis motor 24, moves in the Z-axis direction.

The chuck 2 is attached to the tip side (the side of the lower end portion in FIG. 1A) of the Z-axis movement unit 20. The chuck 2 is positioned by the X-axis movement unit 15 and the Z-axis movement unit 20 being moved based on commands from the controller 3. As a result, operations, such as pick-and-place of a workpiece, are performed. At this time, the X-axis movement unit 15 and the Z-axis movement unit 20 move within predetermined ranges.

In the robot 1 configured as described above, the movable unit, such as the X-axis movement unit 15 or the Z-axis movement unit 20, of which the position changes during operation of the robot 1 may collide with an object that is present within a workspace G (see FIG. 1A). Even when an object is positioned outside of the workspace G, a hand or a finger of a person, for example, may become trapped between the outer edge portion of the movable unit, that is, a structure, such as the X base 16, the Z base 23, or a motor case, that forms the outer shape of the robot 1 and a peripheral object.

In other words, there is risk of collision, trapping, and the like within the range of movement of the movable unit (referred to, hereafter, as the range of movement), or more precisely, the range of movement of the outermost edge portion of the movable unit. Therefore, safety measures, such as surrounding the robot 1 with a safety gate or the like to prevent a person from entering the range of movement, are generally taken.

However, in the actual workplace, entry into the range of movement is a possibility. In addition, in recent years, efforts have been made to improve work efficiency through cooperative work between humans and robots 1. In such instances, people continuously work closely with the robots 1. Therefore, implementation of more reliable safety measures is desired. That is, actualization of intrinsic safety in the robot 1 is desired.

In such instances, as safety measures implemented in the robot 1 (including the surrounding environment of the robot 1), first, preventing the above-described collision, trapping, and the like from occurring can be considered. Specifically, providing a detecting means for detecting objects such as people, and performing control to prevent collision with the object or trapping of the object based on the detection result can be considered. However, should the detecting means malfunction or should control not be correctly performed due to a runaway program or the like, collision and trapping cannot be prevented. In addition, in order to subject the movable unit as a whole to detection, numerous detecting means are required to be provided, thus leading to significant increase in weight and cost.

As another safety measure, providing a mechanism for reducing impact upon collision or the like, and reducing damage to the object can also be considered. In this case, the idea is that further damage to the robot 1 and to the object can be reduced should a collision occur. However, because a mechanism such as this starts operation only after a collision has occurred, the object is impacted at the instant of collision. Therefore, it is difficult to say that safety can be ensured when a human is considered as a subject.

Moreover, when a mechanism such as this is provided, the output of a motor serving as a driving unit is required to be increased because the weight of the movable unit increases. When the output of the motor is increased, a concern arises in that the effects on the human body may actually increase due to the increase in the force applied upon collision. Furthermore, when the motor is increased in size, the motor case for housing the motor also becomes larger, thereby leading to a larger robot 1. As a result, the outer shape of the movable unit becomes larger. The range of movement is required to be reduced to prevent interference with other sections. The workspace G becomes smaller, and work efficiency may decrease.

In this way, so-called intrinsic safety could not be actualized in the robot 1 through conventional safety measures, without causing size increase in the robot 1 and reduced efficiency. Furthermore, when the objective is to prevent the human body from being affected in the event of a collision or trapping, control to prevent collision and trapping in advance, a mechanism that starts operation only when a collision or trapping has occurred, and the like are not helpful in the first place.

As another safety measure, forming the structure of a movable unit using a material that absorbs or reduces impact can be considered. However, when the structure itself is composed of an elastic material, the structure may become deformed or vibrate during movement, and correct positioning may not be possible. In addition, attaching a cushioning member composed of a urethane material or the like to a structure composed of a material having rigidity, such as a metal material, can also be considered. However, in this case, the movable unit increases in size, as described above. Therefore, use of this safety measure is not preferred when efficiency is to be improved through cooperative work with humans.

Here, according to the present embodiment, effects on the human body in the event of a collision or trapping are prevented through appropriate design of the shape of the robot 1. A method for designing the shape to satisfy a safety standard value for pressure and an example of actual application to the robot 1 will be described hereafter.

First, a basic concept of the design will be described.

A collision risk, such as the risk of collision and trapping described above, is present in the robot 1. Therefore, to actualize intrinsic safety in the robot 1, standard values (corresponding to safety standard values) regarding pressing force, impact force, and pressure allowable for the human body, as well as a coefficient of compressibility associated with the standard values, are prescribed by international standards for each part of the human body, for example by ISO/PDTS 15066 as would have been recognized by one skilled in the art as an international standard related to robot safety for each part of the human body. Among the safety standard values, the safety standard values for pressing force and impact force are prescribed based on calculations and measurements. However, a theoretical means has not been established for the safety standard value for pressure. In addition, because measurement is difficult, an estimate value is prescribed.

Therefore, in designing the robot 1, the safety standard values for pressing force and impact force can be easily reflected in the design values of the robot 1. However, reflecting the safety standard value for pressure in the design values is difficult.

Therefore, according to the present embodiment, a means for reflecting the safety standard value for pressure in the design values of the robot 1 is established. In other words, a shape designing method for designing the robot 1 that satisfies the safety standard value for pressure is established.

Figure 2A:
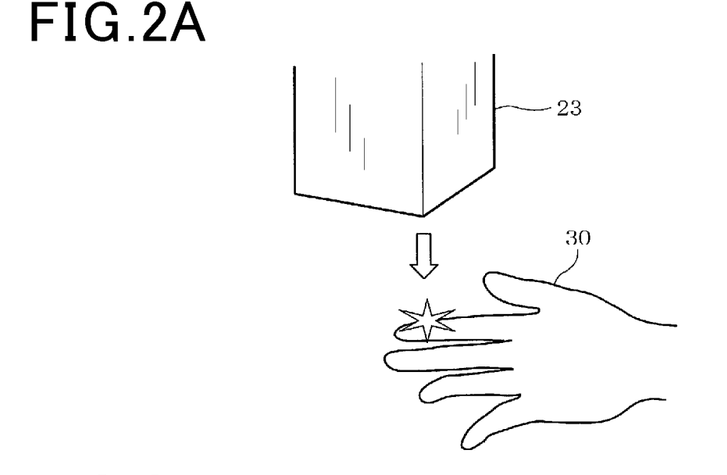
FIGS. 2A to 2C are schematic diagrams of a state in which an arm collides with a human body and the relationship of pressure applied to the human body upon collision.

Pressure can be determined as the force applied per unit area. For example, when a collision between an end portion of the Z base 23 and a human hand 30 is presumed as shown in FIG. 2A, the impact upon collision decreases as the pressing force decreases, and the pressing force becomes dispersed and pressure decreases as the contact area increases, as shown in FIG. 2B.

Therefore, it is considered that impact on the human body can be kept within an allowable range (also referred to, hereafter, as a safe range $R_{safe}$, for convenience) if the pressing force determined by specifications, such as motor output, is set to a range below the safety standard value for pressure (such as 60 [N/cm$^2$] in FIG. 2B) and below the standard value for pressing force (such as 135 [N] in FIG. 2B) prescribed by international standards.

Figure 2B:
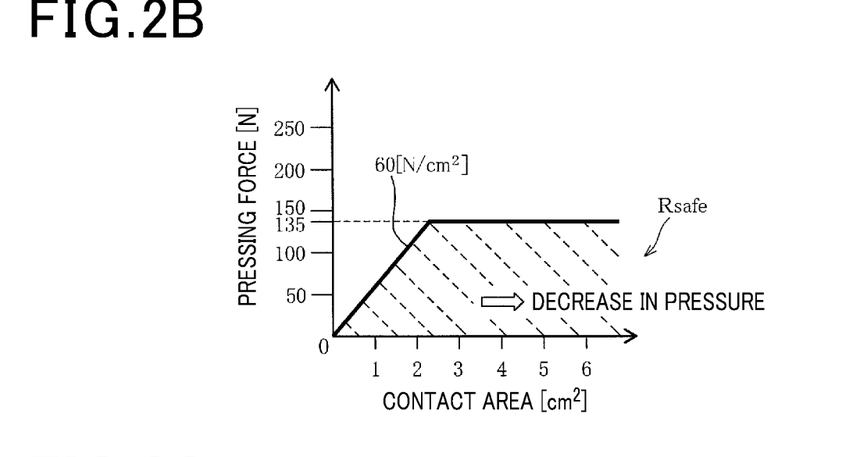

The value 60 [N/cm$^2$] (=0.60 [N/mm$^2$]) indicated in FIG. 2B is the safety standard value for pressure when the finger serves as the subject part of the human body. The international standards prescribe the upper limit of the safety standard value for pressing force, applicable to the finger, as 135 [N]. The upper limit of the safety standard value for impact force, applicable to the finger, is prescribed as 180 [N].

Figure 2C:
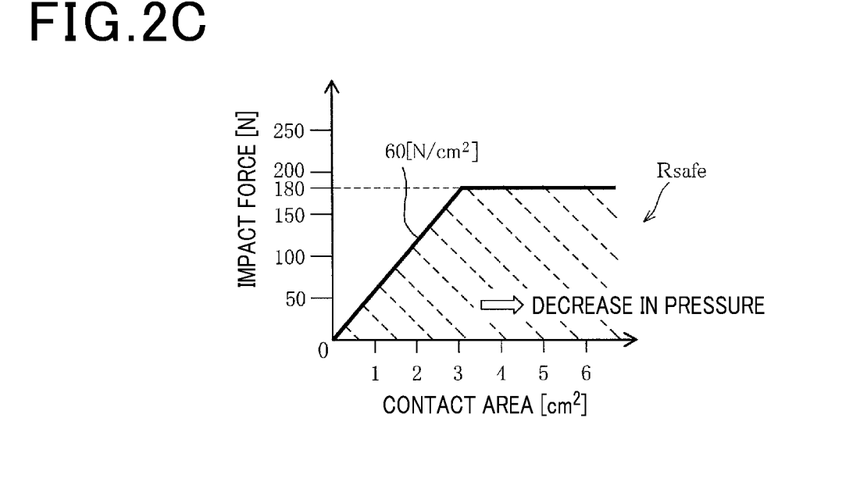

Therefore, in addition to the pressing force, the impact force is required to be set to a range below the standard value, which is 180 [N/cm$^2$], as shown in FIG. 2C. In addition, safety standard values are similarly prescribed for other parts of the human body, such as the leg and arm. However, the safety standard values for the finger, among the parts considered likely to be involved in a collision or trapping with the robot 1, are set to the most stringent (lowest) values.

To design a shape that satisfies the safety standard value for pressure, according to the present embodiment, first, a model of a collision state between the robot 1 and the human body is created based on the safety standard values and a characteristic value (the above-described coefficient of compressibility) of the human body.

Figure 3:
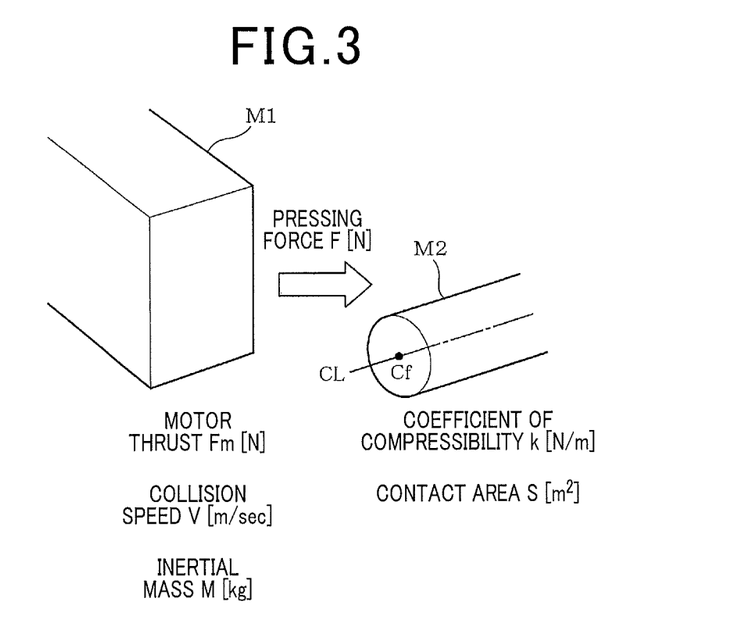
FIG. 3 is a diagram of a state in which the arm and the human body are modelized.

FIG. 3 shows the modelized robot 1 and human finger. In FIG. 3, the robot 1 is indicated as a predicted colliding section M1 and the finger is indicated as a collided section M2. The predicted colliding section M1 is driven by a motor having a motor thrust Fm [N] and modelized as having a collision speed V [m/sec] and an inertial mass M [kg]. The predicted colliding section M1 corresponds to the outer shape of a movable unit of the robot 1, which is a section that may possibly collide with a human body, such as a corner portion of the X base 16 or Z base 23 formed into the substantially rectangular columnar shape, or a corner portion of a motor case.

In the collided section M2, a deformation amount (depression amount, described hereafter) by which deformation occurs when a collision with the predicted colliding section M1 occurs is modelized based on the coefficient of compressibility k [N/m] and a contact area S [m$^2$] between the predicted colliding section M1 and the collided section M2 when a collision with the predicted colliding section M1 occurs.

To determine the pressure applied to the collided section M2, the pressing force upon collision by the predicted colliding section M1 is required to be determined. As is well-known, the pressing force F [N] can be calculated from electrical specifications, such as motor torque or current limit ratio, or from mechanical specifications, such as pulley diameter and those related to a ball screw, such as a lead. In this case, when a maximum torque value is used, the maximum pressing force F of the subject robot 1 can be determined. The maximum value of the pressing force F is required to satisfy the above-described international standards.

For reference, in a typical Cartesian coordinate robot, the pressing force of the Z-axis movement unit 20 is often the largest. A reason for this is that, in the Z-axis movement unit 20, the lead of the trapezoidal slide is designed to be small to prevent falling due to gravitational force. Therefore, even when the output of each motor is the same, the Z-axis movement unit 20, of which the movement distance per unit frequency of the motor is short, has the largest pressing force.

Therefore, according to the present embodiment, the maximum value of the pressing force of the Z-axis motor 24 is calculated and used. According to the present embodiment, the pressing force of the Z-axis motor 24 is 110 [N] and satisfies the international standards (135 [N]). When, for example, the pressing force of the Y-axis motor 13 that drives the X-axis movement unit 15 and the Z-axis movement unit 20 is the largest, this pressing force may, of course, be used.

When confirmation is made that the pressing force satisfies the international standards, next, a pressure can be determined by the contact area S being determined. In this case, the contact area S can be determined from the pressing force F, the shape of the predicted colliding section M1, and the deformation amount of the collided section M when pressed by the predicted colliding section M1 with the pressing force F. The deformation amount of the collided section M can be determined from the coefficient of compressibility k.

The following two methods can be considered when modelizing the finger. In a first method, the finger is modelized based on the premise that the cross-section of the finger is substantially a square (model A, described hereafter). In a second method, the finger is modelized based on the premise that the cross-section of the finger is substantially a circle (model B, described hereafter). The two methods will be separately described hereafter. However, both methods are based on a common technical concept of determining pressure based on the shape of the predicted colliding section M1 (robot 1) and the deformation amount of the collided section M2 (human finger) when collision with the predicted colliding section M1 occurs.

(Model A)

Figure 4A:
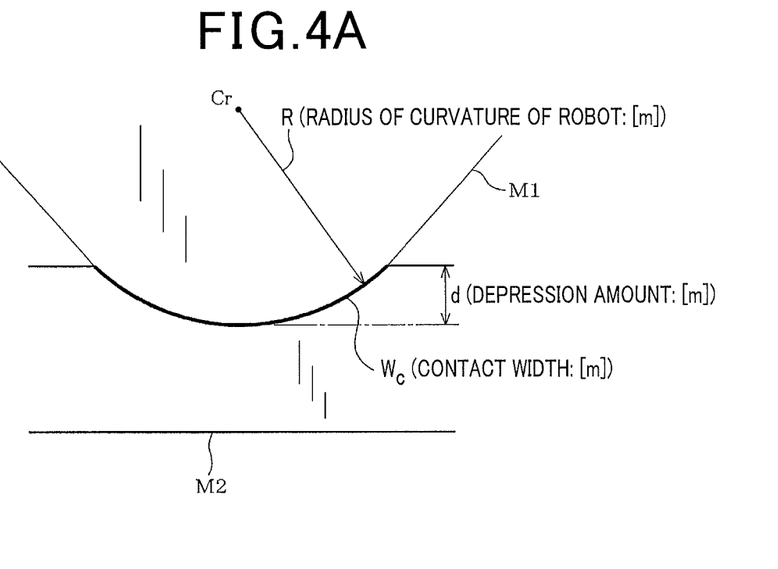
FIGS. 4A and 4B are schematic diagrams of a collision state when the arm collides with the human body, shown using a rectangular columnar model.

FIG. 4A schematically shows a state in which collision with the predicted colliding section M1 occurs and the collided section M is pressed by the predicted colliding section M1. FIG. 4A shows a view from a side surface of the finger. The predicted colliding section M1 is presumed to be, for example, the lower end of the Z base 23.

The predicted colliding section M1 is formed such that the radius of curvature thereof is R. An object according to the present embodiment is to determine the radius of curvature R, or in other words, to provide a designing method by which the shape (particularly the outer shape) of the movable unit corresponding to the predicted colliding section M1 is determined.

Figure 4B:
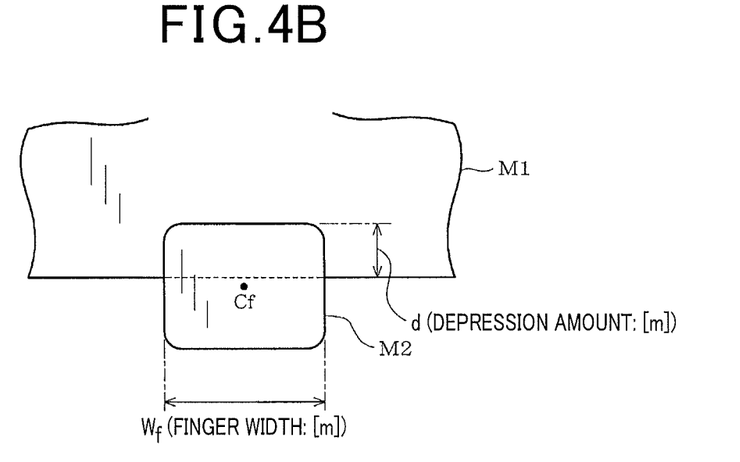

A depression amount d [m] of the collided section M2 can be determined from the coefficient of compressibility k. In other words, the coefficient of compressibility k can also be considered a spring coefficient of the finger. Therefore, d=F/k can be calculated based on Hooke's law. When the depression amount d is determined, a contact width Wc [m] indicated in FIG. 4A is mathematically determined to be Wc=2×R×cos$^{-1}$(R−(F/k))/R. Furthermore, when the contact width Wc is determined and the cross-section of the width Wf of the collided section M2 is substantially a square as shown in FIG. 4B, the contact area S [m$^2$] can be determined to be S=Wc×Wf. Cf schematically indicates the center position of the collided section M2.

When the contact area S is determined, pressure P [N/mm$^2$] can be determined as in expression (3), below.

$$P = \frac{F}{2W_f \times R \times \cos^{-1}\left(\frac{R - \frac{F}{k}}{R}\right)} \quad (3)$$

When the pressure P is below 0.60 [N/mm$^2$], which is the above-described safety standard value, the safety requirement prescribed by the international standards is satisfied. In other words, when the safety standard value for pressure is Ps, when the shape of the robot 1, which is the conditions of expression (3), is designed to satisfy the relationship of P≤Ps, the safety standard value can be satisfied. A robot 1 actualizing intrinsic safety can be manufactured.

In this way, as a result of the outer shape of the movable unit of the robot 1, such as the corner portion of the X base 16 or the Z base 23, being set to a curved shape (so-called R shape) having the radius of curvature R in which P in expression (3) satisfies P≤Ps, rather than being set to a simple right angle, the safety standard value can be satisfied.

(Model B)

Figure 5:
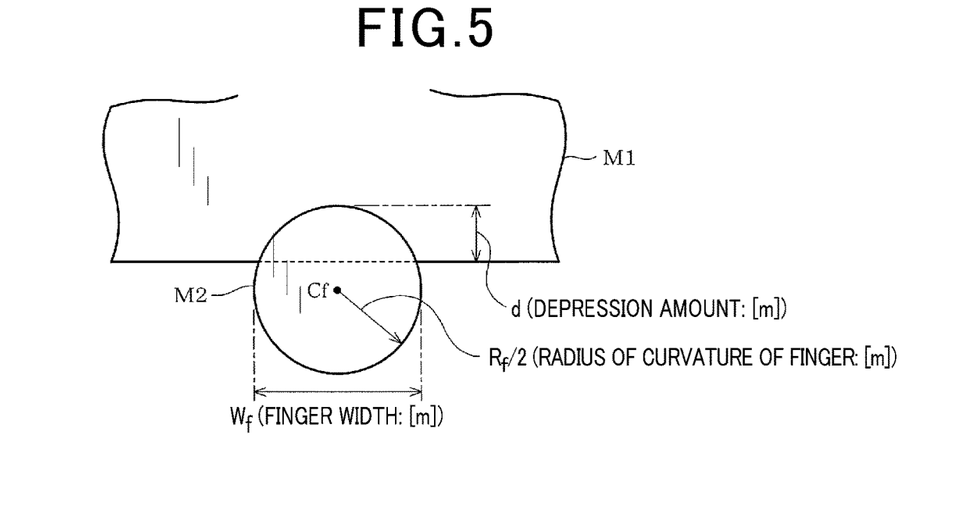
FIG. 5 is a schematic diagram of a collision state when the arm collides with the human body, shown using a circular columnar model.

In model B, as shown in FIG. 5, a model in which the cross-section of a diameter Rf is substantially circular is presumed as the collided section M2. Cf schematically indicates the center position of the collided section M2. At this time, a collision with the predicted colliding section M1 that causes deformation of the collided section M2 is considered, as shown in FIG. 5.

At this time, in a manner similar to that in the above-described model A, the pressure P when the finger is presumed to have a circular shape can be determined by expression (4), below, by mathematically determining the depression amount d, the contact width Wc, the contact area S, and the like.

$$P = \frac{F}{4 \times R \times R_f \times \cos^{-1}\left(\frac{R - \frac{F}{k}}{R}\right) \times \cos^{-1}\left(\frac{R_f - \frac{F}{k}}{R_f}\right)} \quad (4)$$

When the pressure P is below 0.60 [N/mm$^2$], which is the above-described safety standard value, the safety requirement prescribed by the international standards is satisfied. In other words, when the safety standard value for pressure is Ps, when the shape of the robot 1, which is the conditions of expression (4), is designed to satisfy the relationship of P≤Ps, the safety standard value can be satisfied. A robot 1 actualizing intrinsic safety can be manufactured.

In this way, as a result of the outer shape of the movable unit of the robot 1, such as the corner portion of the X base 16 or the Z base 23, being set to a curved shape (so-called R shape) having the radius of curvature R in which P in expression (4) satisfies P≤Ps, rather than being set to a simple right angle, the safety standard value can be satisfied.

A specific example of model B is as follows. When the maximum thrust (=maximum value of pressing force) of the Z-axis motor 24 determined from the specifications of the robot 1 at the lower end portion of the Z base 23 is approximately 61 [N] and the diameter Rf of the finger is 0.018 [m], if the radius of curvature is substantially 0.005 m (=5 mm), the pressure P is approximately 0.59 [N/mm$^2$]. Therefore, it is clear that, to attain a pressure P that is below 0.60 [N/mm$^2$], which is the safety standard value, the lower end portion (corner portion) of the Z base 23 should be designed such that the radius of curvature R>5 mm.

Here, 5 mm, which is the standard value of the radius of curvature R in the specific example, is merely an example. For example, when the pressing force is weak, such as when the output of the motor is small, the standard value may be lower than 5 mm. Conversely, when the pressing force is strong, such as when the output of the motor is large, the standard value may be higher than 5 mm.

In this way, according to the present embodiment, the finger, which is subjected to the most stringent safety standards, is presumed to be the collided section M2. The maximum pressing force is determined from the specifications of the robot 1. The depression amount is determined from the pressing force. The contact area is determined from the depression amount. The pressure upon contact with the human body is thereby determined. The shape of the robot 1 is designed such that this pressure, that is, the pressure applied when a movable unit collides with the human body at maximum thrust satisfies the safety standard value prescribed by the international standards.

Figure 6:
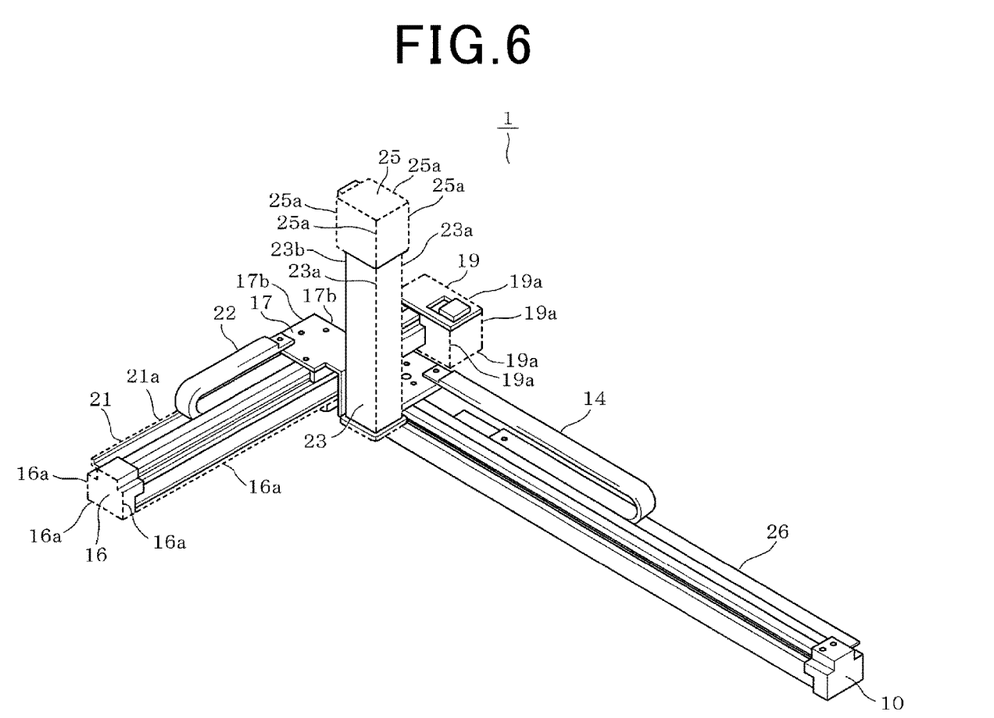
FIG. 6 is a schematic diagram of a section in which trapping may occur in the robot according to the embodiment.

FIG. 6 shows an example of the predicted colliding section M1. The predicted colliding section M1 where trapping may occur is schematically shown in FIG. 6 by the broken lines. The corner portion of a structure is applicable as the predicted colliding section M1. For example, the predicted colliding section M1 corresponds to an end portion 16a of the X base 16, an end portion 17a of the support plate 17, an end portion 19a of the X motor case 19, an end portion 21a of the rail 21, an end portion 23a of the Z base 23, an end portion 25a of the Z motor case 25, or the like.

The predicted colliding section M1 shown in FIG. 6 is an example. Sections not shown in the perspective view and the like are also set as the predicted colliding section M1. A rail 26 provided along the Y base 10 is not movable and, therefore, is excluded from applicability as the predicted colliding section M1. In addition, trapping does not occur in an end portion 23b of the Z base 23 on the support plate 17 side and the like. Therefore, these sections are also excluded from applicability. However, these sections may be included when collision is being considered.

According to the embodiment described above, the following effects can be achieved.

In the robot 1, the shape of the predicted colliding section M1 that, among the movable portions, may collide with the human body during movement is set such that the pressure applied to the human body (collided section M1) when driven at maximum thrust by a motor and collided with the human body satisfies the safety standard value for pressure prescribed in advance for the human body. As a result, even should a predicted colliding section M1, such as the outer edge portion of the X base 16, collide with a human body, the safety standard value for pressure applied to the human body is not exceeded. Therefore, intrinsic safety can be actualized in the robot 1.

In addition, when the X base 16 and the Z base 23 have a substantially rectangular columnar outer shape, the X base 16 and the Z base 23 are substantially planar (that is, the radius of curvature thereof is infinite), excluding the corner portions. Therefore, as long as the pressure when a collision with the corner portion occurs satisfies the safety standard value, the safety standard value for pressure can be satisfied even when a collision with the side surface or the like occurs.

In addition, a structure that reduces pressure is obtained by the shape of the predicted colliding section M1. Therefore, unlike when the aforementioned cushioning material and the like is used, the outer shape does not increase in size.

Furthermore, as a result of the corner portion serving as the predicted colliding section M1, excessive increase in size can be prevented. In a Cartesian coordinate robot such as the robot 1, space for housing pulleys and belts is required within. In this case, when the X base 16 is formed into a circular column, for example, the outer shape becomes larger compared to that of a rectangular column. Therefore, as a result of the corner portion serving as the predicted colliding section M1, safety can be ensured without causing unnecessary increase in size.

In addition, intrinsic safety can be actualized in the robot 1 through use of a design method such as that described above, or in other words, the following shape designing method. In the method, the pressing force (F) when the predicted colliding section M1, which, among the movable units, may collide with a human body during movement, collides with the human body is determined based on the specifications of the driving unit. The depression amount (d) by which the predicted colliding section M1 sinks into the human body upon collision is determined based on the pressing force and the coefficient of compressibility (k) of the human body prescribed in advance. The contact area (S) between the human body and the predicted colliding section M1 is determined based on the depression amount and the shape (radius of curvature R) of the predicted colliding section M1. The pressure (P) applied to the human body by the predicted colliding section M1 is determined based on the contact area and the pressing force. The shape of the predicted colliding section M is designed such that the pressure applied to the human body is below the safety standard value for pressure prescribed in advance.

The finger may be damaged even with relatively small force, compared to other parts of the human body. Therefore, by setting the radius of curvature R of the predicted colliding section M1 to a range satisfying the safety standard values, the part of the human body most vulnerable to damage can be protected.

In addition, the safety standard values for other parts, such as the upper arm, are prescribed to be relatively higher than those for the finger. Therefore, when the safety standard values for the finger are satisfied, the safety standards for the other parts can naturally be satisfied.

In this case, when the finger is modelized such that the cross-sectional shape thereof is a square having the width Wf, as in model A, the coefficient of compressibility of the finger is k, and the maximum value of the prescribed safety standards for pressure is Ps, the radius of curvature R is merely required to be set to a range in which P in expression (3) satisfies $P \leq Ps$. As a result, a robot 1 that satisfies the safety standard values can be designed.

In addition, the finger can be modelized such that the cross-sectional shape thereof is a circle having a diameter Rf, as in model B. The radius of curvature R is merely required to be set to a range in which P in expression (4) satisfies $P \leq Ps$. In this case as well, a robot 1 that satisfies the safety standard values can be designed. Whether to use model A or model B can be selected as appropriate.

In addition, as a result of the safety standard value for pressure being satisfied, the safety standard value for impact force can also be satisfied, as is clearly indicated in FIG. 2C.

Other Embodiments

The present invention is not limited to the configuration given as an example according to the above-described embodiment. Modifications, combinations, and expansions can be arbitrarily made without departing from the scope of the present invention.

The numerical values given as examples according to the embodiment are examples. The present invention is not limited thereto. That is, the safety standard value changes when the subject part of the human body changes. When the safety standard value changes, the radius of curvature also changes. In addition, should the safety standard values themselves be revised, the required radius of curvature also changes. In such cases as well, intrinsic safety can be actualized by designing the shape of the robot by calculating the radius of curvature based on the concept described according to the embodiment.

Among the parts of the human body, the finger is premised as the collided section M according to the embodiment. However, other parts may be premised. For example, when the robot 1 is disposed in a location where contact with the legs of a person is conceived possible, but not the hands, the shape of the robot 1 may be designed with the leg presumed as the collided section M2.

In addition, the finger is modelized with the cross-sectional shape thereof as either a square or a circle, according to the embodiment. However, the finger may be modelized using another shape, such as an ellipse. The same applies when other parts of the human body are modelized.

According to the embodiment, the shape of the structure (frame) of the robot 1 itself, such as the corner portions of the X base 16 and the Z base 23, is configured to reduce pressure. However, a movable unit may be provided a cover member that changes the outer shape thereof. That is, a structure that forms the outer shape of a movable unit in the present invention includes a member that is attached to the movable unit to change the outer shape thereof, in addition to the frames, such as the X base. In this case, the cover member is merely a member that changes the outer shape of the moveable unit. Unlike the above-described cushion material and the like, the cover member is not required to be composed of a material that reduces impact or the like. The cushion material and the like absorb or reduce impact through the material, and therefore, essentially require thickness. As a result, the cushion material or the like leads to an increase in size in the outer shape of the movable unit, a smaller workspace G, and the like.

In this regard, when the purpose is to merely change the outer shape of the movable unit, a thin cover member can be used. Excessive increase in size can be suppressed. In addition, in a configuration in which a cover member is attached, the cover member can be applied to an existing robot 1, and safety can be ensured.

Figure 7:
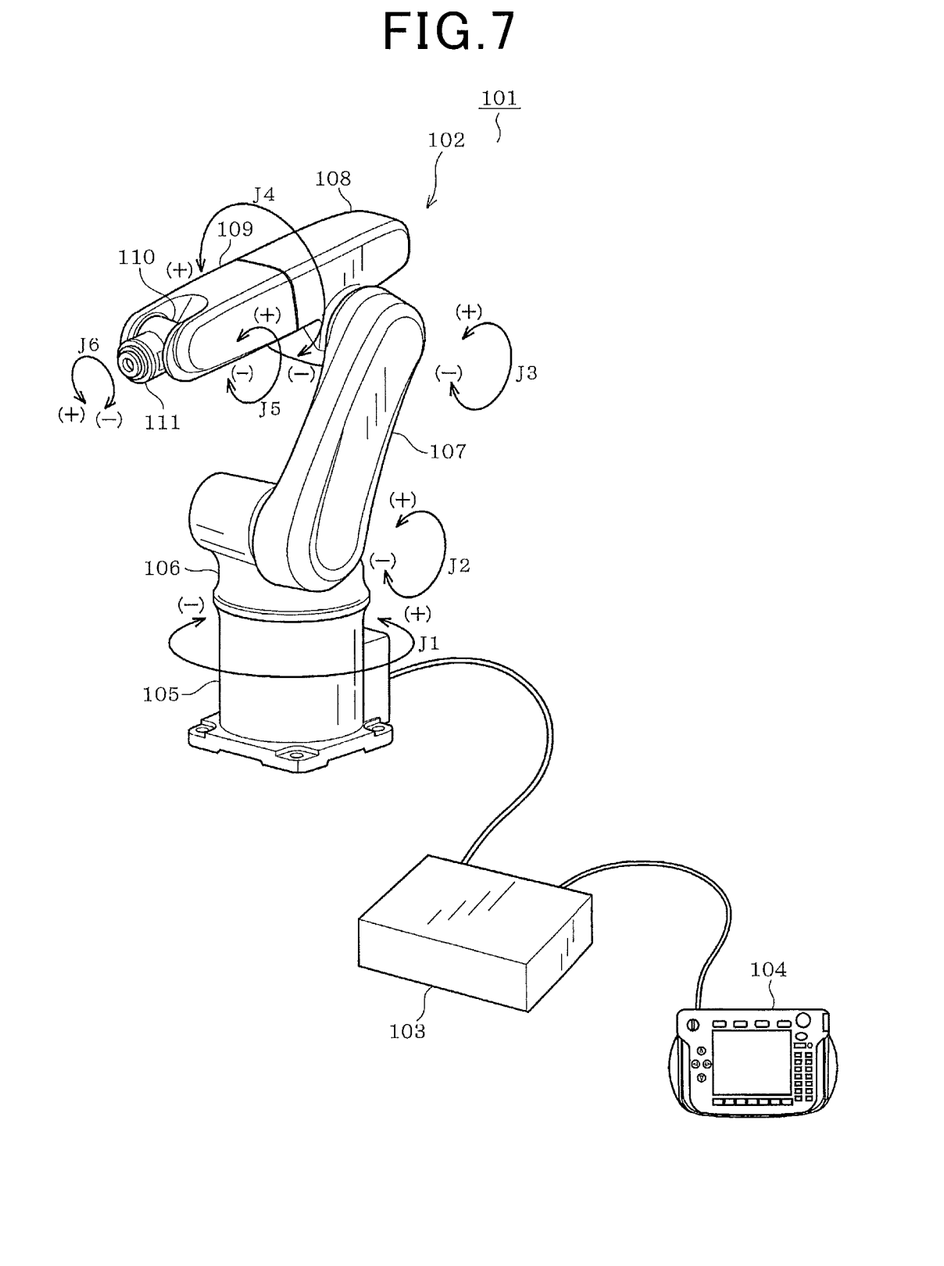
FIG. 7 is a schematic diagram of an outer appearance of another robot.

In addition, the present disclosure may be applied to a perpendicular articulated robot having a plurality of arms as movable units, such as that shown in FIG. 7 (a so-called six-axis robot is shown in FIG. 7), a horizontal articulated robot having movable units that are rotatable in the horizontal direction, a direct-drive robot in which a movable unit moves in one or two axial directions, and the like.

FIG. 7 illustrates an appearance of a perpendicular articulated robot system 101 as a target of control in the present embodiment. As shown in FIG. 7, the robot system 101 includes a robot 102, a control unit 103 that controls the robot 102, and a teaching pendant 104 connected to the control unit 103. The teaching pendant 104 may be connected to the control unit 103 only when teaching is carried out, or may be integrally configured with the control unit 103.

The robot 102 is a so-called six-axis vertical articulated robot having a well-known configuration. Specifically, the robot 102 includes a base 105, a shoulder 106, a lower arm 107, a first upper arm 108, a second upper arm 109, a wrist 110 and a flange 111.

The shoulder 106 is arranged on the base 105 and connected thereto via a Z-direction first axis J1 so as to be rotatable in the horizontal direction. The shoulder 106 is connected, via a V-direction second axis J2, to a lower end of the lower arm 107 extending upward, so as to be rotatable in the vertical direction. The lower arm 107 has a tip end to which the first upper arm 108 is connected via a Y-direction third axis J3 so as to be rotatable in the vertical direction. The first upper arm 108 has a tip end to which the second upper arm 109 is connected via an X-direction fourth axis J4 so as to be rotatable in a twisting manner. The second upper arm 109 has a tip end to which the wrist 110 is connected via a Y-direction fifth axis J5 so as to be rotatable in the vertical direction. To the wrist 110, the flange 111 is connected via an X-direction sixth axis J6 so as to be rotatable in a twisting manner.

The flange 111 as a tip of the arm of the robot 102 is mounted with an end effector (which is for example a hand), which is not shown. The end effector is mounted with a jig or a tool, for example, which holds and conveys a work, not shown, or processes or assembles works. The axes J1 to J6 of the robot 102 are provided with respective electric motors (not shown), respective encoders (not shown) for detecting rotational positions of the respective motors, respective deceleration mechanisms (not shown) for decelerating the output of the respective motors, and the like.

In addition, the present disclosure can, of course, be applied to a robot that is provided with a detecting means for detecting an object, such as a person, and actualizes functional safety by performing control to prevent collision and trapping based on the detection results. In such a configuration, collision and trapping can initially be prevented through functional safety. Should the detecting means malfunction or abnormal control occur, the shape of the robot 1 itself serves as a final line of defense. As a result, effects on the human body, such as injuries, can be reduced and safety of the robot 1 can be further enhanced.

What is claimed is:

1. An industrial robot comprising:
a movable unit; and
a driving unit that drives the movable unit,
the movable unit comprising a predicted colliding section that is a structure forming an outer shape of the movable unit and may collide with a human body during movement of the movable unit, the predicted colliding section being formed to have a predetermined shape such that a pressure applied to a human body is lower than a predetermined safety standard value for pressure for the human body, the predetermined safety standard value for pressure for the human body being defined by an international standard related to robot safety, when the movable unit is driven at maximum thrust by the driving unit and collides with the human body, wherein:
a collided section of the human body with which the predicted colliding section may collide is assumed to be a finger; and
a shape of the predicted colliding section is formed into a curved surface having a radius of curvature that is set to a range satisfying the following expression (1), $$\frac{F}{2W_f \times R \times \cos^{-1}\left(\frac{R - \frac{F}{k}}{R}\right)} \leq P_S \quad (1)$$

where: R is the radius of curvature of the curved surface of the predicted colliding section; F is a pressing force when the driving unit drives the movable unit at maximum thrust and the predicted colliding section presses against the human body; Wf is a width, input by the user, of the finger of which a cross-sectional shape is modelized as a square having the width, Wf being 0.018 m; k is a coefficient of compressibility of the finger that is defined by the international standard related to robot safety, the international standard related to robot safety being ISO/PDTS 15066 and having the coefficient of compressibility of the finger described therein, the coefficient of compressibility of the finger being 75 N/mm as defined by ISO/PDTS 15066; and Ps is a maximum value of the predetermined safety standard value for pressure for the finger that is defined by the international standard related to robot safety, Ps being 0.60 N/mm².

2. An industrial robot comprising:

a movable unit; and a driving unit that drives the movable unit, the movable unit comprising a predicted colliding section that is a structure forming an outer shape of the movable unit and may collide with a human body during movement of the movable unit, the predicted colliding section being formed to have a predetermined shape such that a pressure applied to a human body is lower than a predetermined safety standard value for pressure for the human body, the predetermined safety standard value for pressure for the human body being defined by an international standard related to robot safety, when the movable unit is driven at maximum thrust by the driving unit and collides with the human body, wherein:

a collided section of the human body with which the predicted colliding section may collide is assumed to be a finger; and a shape of the predicted colliding section is formed into a curved surface having a radius of curvature that is set to a range satisfying following expression (2), $$\frac{F}{4 \times R \times R_f \times \cos^{-1}\left(\frac{R - \frac{F}{k}}{R}\right) \times \cos^{-1}\left(\frac{R_f - \frac{F}{k}}{R_f}\right)} \leq P_S \quad (2)$$

where: R is the radius of curvature of the curved surface of the predicted colliding section; F is a pressing force when the driving unit drives the movable unit at maximum thrust and the predicted colliding section presses against the human body; Rf is a diameter, input by the user, of the finger of which a cross-sectional shape is modeled as a circle having the diameter, Rf being 0.018 m; k is a coefficient of compressibility of the finger that is defined by the international standard related to robot safety, the international standard related to robot safety being ISO/PDTS 15066 and having the coefficient of compressibility of the finger described therein, the coefficient of compressibility of the finger being 75 N/mm as defined by ISO/PDTS 15066; and Ps is a maximum value of the predetermined safety standard value for pressure for the finger that is defined by the international standard related to robot safety, Ps being 0.60 N/mm².

3. A method for designing a shape of an industrial robot that includes a movable unit and a driving unit that drives the movable unit, the method comprising:

designing a shape of a predicted colliding section of the movable unit that may collide with a human body during movement of the movable unit, the shape of the predicted colliding section having a predetermined shape such that a pressure applied to the human body is less than a predetermined safety standard value for pressure for the human body, the predetermined safety standard value for pressure for the human body being defined by an international standard related to robot safety, the pressure being a pressure applied to the human body when the movable unit is driven at maximum thrust by the driving unit and collides with the human body, wherein:

a collided section of the human body with which the predicted colliding section may collide is assumed to be a finger; and a shape of the predicted colliding section is formed into a curved surface having a radius of curvature that is set to a range satisfying the following expression (1), $$\frac{F}{2W_f \times R \times \cos^{-1}\left(\frac{R - \frac{F}{k}}{R}\right)} \leq P_S \quad (1)$$

where: R is the radius of curvature of the curved surface of the predicted colliding section; F is a pressing force when the driving unit drives the movable unit at maximum thrust and the predicted colliding section presses against the human body; Wf is a width, input by the user, of the finger of which a cross-sectional shape is modeled as a square having the width, Wf being 0.018 m; k is a coefficient of compressibility of the finger that is defined by the international standard related to robot safety, the international standard related to robot safety being ISO/PDTS 15066 and having the coefficient of compressibility of the finger described therein, the coefficient of compressibility of the linger being 75 N/mm as defined by ISO/PDTS 15066; and Ps is a maximum value of the predetermined safety standard value for pressure for the finger that is defined by the international standard related to robot safety, Ps being 0.60 N/mm².

4. A method for designing a shape of an industrial robot that includes a movable unit and a driving unit that drives the movable unit, the method comprising:

designing a shape of a predicted colliding section of the movable unit that may collide with a human body during movement of the movable unit, the shape of the predicted colliding section having a predetermined shape such that a pressure applied to the human body is less than a predetermined safety standard value for pressure for the human body, the predetermined safety standard value for pressure for the human body being defined by an international standard related to robot safety, the pressure being a pressure applied to the human body when the movable unit is driven at maximum thrust by the driving unit and collides with the human body, wherein:

a collided section of the human body with which the predicted colliding section may collide is assumed to be a finger; and a shape of the predicted colliding section is formed into a curved surface having a radius of curvature that is set to a range satisfying following expression (2), $$\frac{F}{4 \times R \times R_f \times \cos^{-1}\left(\frac{R - \frac{F}{k}}{R}\right) \times \cos^{-1}\left(\frac{R_f - \frac{F}{k}}{R_f}\right)} \leq P_S \quad (2)$$

where: R is the radius of curvature of the curved surface of the predicted colliding section; F is a pressing force when the driving unit drives the movable unit at maximum thrust and the predicted colliding section presses against the human body; Rf is a diameter, input by the user, of the finger of which a cross-sectional shape is modelized as a circle having the diameter, Rf being 0.018 m; k is a coefficient of compressibility of the finger that is defined by the international standard related to robot safety, the international standard related to robot safety being ISO/PDTS 15066 and having the coefficient of compressibility of the finger described therein, the coefficient of compressibility of the finger being 75 N/min as defined by ISO/PDTS 15066; and Ps is a maximum value of the predetermined safety standard value for pressure for the finger that is defined by the international standard related to robot safety, Ps being 0.60 N/mm$^2$.

* * * * *